United States Patent [19]

Babel

[11] 4,215,961
[45] Aug. 5, 1980

[54] LOCKING MECHANISM FOR THE MANDREL COLLAR ON MILLING AND DRILLING SPINDLES

[75] Inventor: Werner Babel, Pfronten-Meilingen, Fed. Rep. of Germany

[73] Assignee: Maho Werkzeugmaschinenbau Babel & Co., Achweg, Fed. Rep. of Germany

[21] Appl. No.: 941,374

[22] Filed: Sep. 12, 1978

[30] Foreign Application Priority Data

Sep. 20, 1977 [DE] Fed. Rep. of Germany ... 7729164[U]

[51] Int. Cl.² .............................. B23C 9/00; B23Q 1/28
[52] U.S. Cl. .......................................... 409/231; 188/75; 279/34; 403/373; 408/239 R; 409/241
[58] Field of Search ............... 90/11 A; 409/231, 241; 408/239, 239 A; 279/34; 403/373; 188/75

[56] References Cited

U.S. PATENT DOCUMENTS 2,342,829  2/1944  Armitage ......................... 409/241 X

FOREIGN PATENT DOCUMENTS

| 970591 | 10/1958 | Fed. Rep. of Germany . |
| 2238287 | 9/1973 | Fed. Rep. of Germany . |
| 263097 | 8/1949 | Switzerland ..................... 188/75 |
| 512777 | 8/1937 | United Kingdom .................... 403/373 |
| 207650 | 12/1967 | U.S.S.R. .................................... 90/11 A |

*Primary Examiner*—Z. R. Bilinsky
*Attorney, Agent, or Firm*—Weingarten, Maxham & Schurgin

[57] ABSTRACT

A tightening and clamping mechanism for the mandrel collar of a milling or boring spindle. The clamping elements are semi-circular devices with notches in their outer surfaces. By engaging the notches with retainer pins and tightening actuators, the clamping elements may be closed around the mandrel collar thereby securing it to the spindle housing.

2 Claims, 4 Drawing Figures

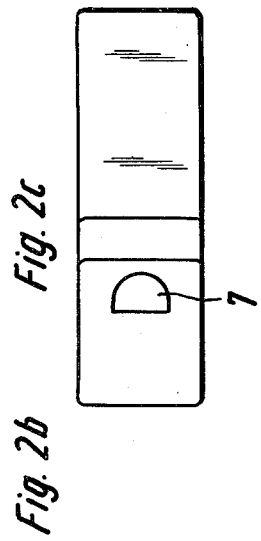
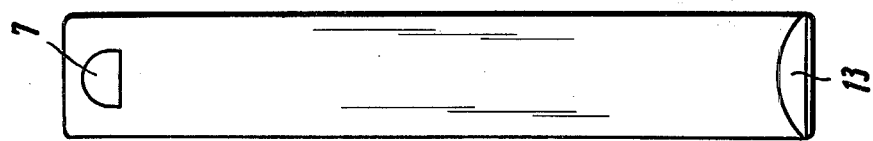
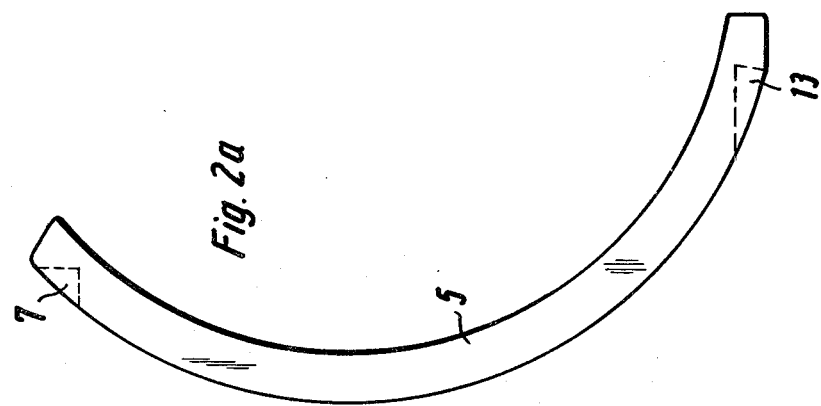

LOCKING MECHANISM FOR THE MANDREL COLLAR ON MILLING AND DRILLING SPINDLES

FIELD OF THE INVENTION

This invention concerns a locking mechanism for the mandrel collar of a mill or drilling spindle with the associated clamping element and a hand operated tensioning device consisting of a hand grip and screw spindle.

DISCUSSION OF THE PRIOR ART

Mandrel collar clamps serve to fix the axial position of the tool spindle in any arbitrary axial position with respect to the spindle housing, and the clamp prevents the position of the tool spindle from changing.

In one well known mandrel collar clamp design (German Pat. No. 970,591), clamps are situated such that they grip on the outer radius of the mandrel collar and are made to grip the collar through actuation of a tightening mechanism. The disadvantage of this well known design is the concentration of the clamping force into two somewhat limited areas near where the actuator connects the clamps with the tightening mechanism, and can lead to radial deformation, especially of thin-walled mandrel collars. In addition, this force which is applied in most cases to only one side of the mandrel collar, results in a higher load on one side of the spindle bearing than on the other, and therefore can cause the spindle to slip sideways out of line.

In the case of another previously described mandrel collar clamp (German Pat. No. 2,238,287), a longitudinal nut is machined into the spindle collar itself, into which the clamp actuator extends. The actuator is connected to a clamp screw and spreads the clamp collar radially when it is advanced. The outer surface of the clamping collar is thereby pressed against the side walls of the right angle longitudinal nut in the mandrel socket. In this manner, the spreading of the clamp collar itself is accomplished, and this allows a large area of the interior wall of the spindle housing to be in contact. This well known design has the disadvantage that the mandrel collar itself, because of the longitudinal nut, has a weak area and after long periods of operation a certain play occurs in the longitudinal nut. This is accompanied by a wearing off of the effective wall of the nut and adversely affects the exact clamp positioning of the mandrel.

SUMMARY OF THE INVENTION

The present invention overcomes the disadvantage of both of these well known designs by avoiding the one-sided concentration of clamping force on the mandrel collar without creating the weak areas which are associated with nuts or other types of threaded tighteners.

The present invention accomplishes the desired purpose with the clamping elements formed as two circularly bent clamps arranged in a circumferential groove on the spindle housing. The housing has cylindrically tapered retainer pins, the front end of each of which extends into a notch formed in the clamping element itself.

When the tightener is loose, the two clamping elements are held in the circumferential groove of the spindle housing by their associated retainer pins. By advancing the clamping screw of the tightener, an effective force is applied upon the two free ends of the clamp rings. Because the retainer pins which rest in the notches limit the circumferential slippage of the clamping ring, the clamping force is carried over to the pins from the tightener. Thus, the angular surface of the notch is effective in that it pushes this end of the clamping ring radially inward and tightens it against the cylindrical mandrel housing. In the improved clamping arrangement of this invention, an effective clamping force is accomplished by advancing the screw tightener. This force is effective on four angularly displaced zones which are opposite one another, and thus have a central action on the mandrel collar. By distribution of the clamping force, deformation of the mandrel collar and one-sided loading of the mandrel bearings is avoided.

A further advantageous development of this invention features an angular cut-away on one end of the retainer pins, into which a diagonal edge protrudes from the actuating shoulder or collar of the screw spindle.

BRIEF DESCRIPTION OF THE DRAWING

The objects, advantages and features of the invention will be more readily appreciated from the following detailed description when read in conjunction with the accompanying drawing in which:

FIG. 2a, 2b and 2c are side, end and plan views respectively of a clamping element shown in FIG. 1.

DESCRIPTION OF THE PREFERRED EMBODIMENT

Figure 1:
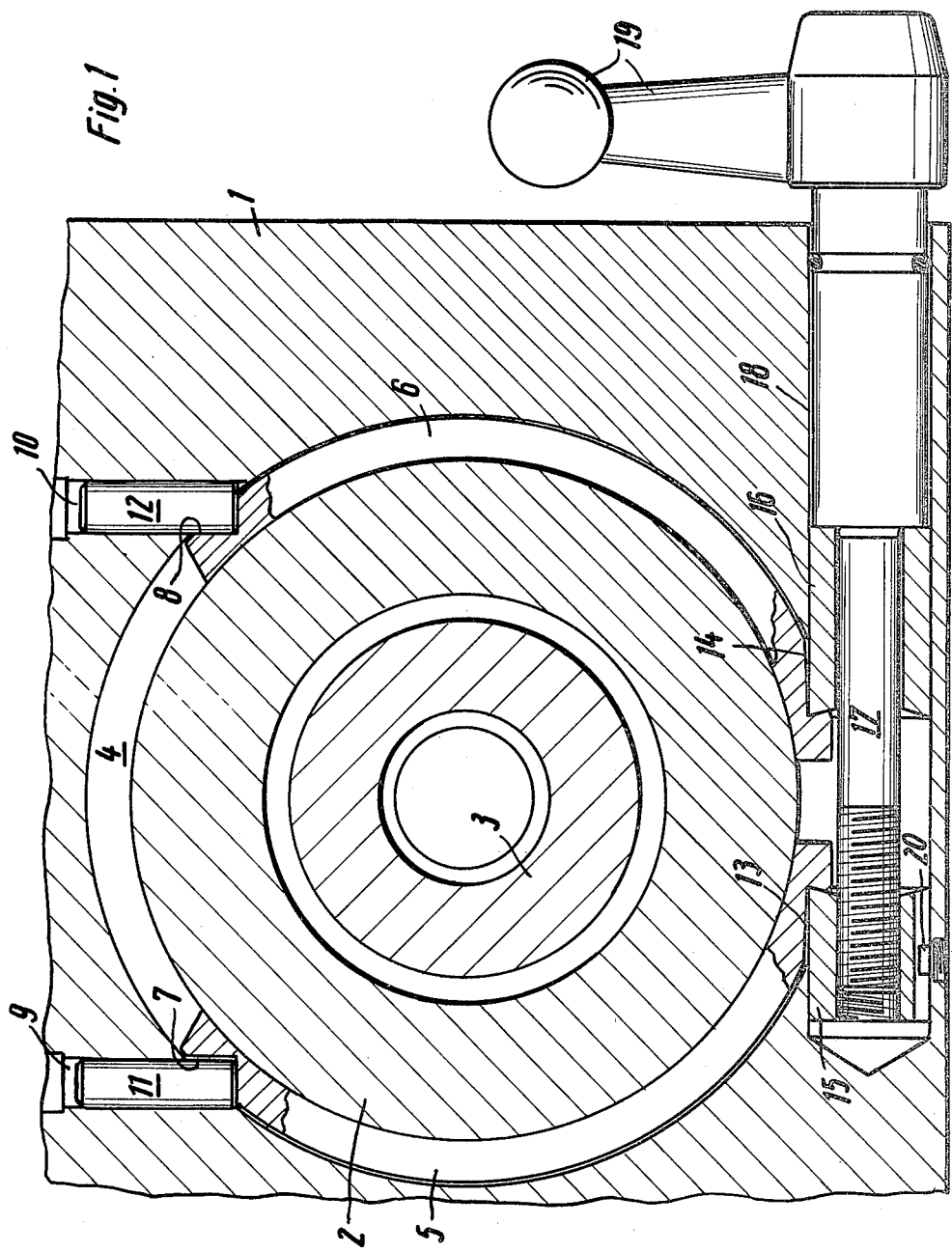
FIG. 1 is a sectional view through the spindle showing the clamping device of the invention.

In the mill mandrel as illustrated in FIG. 1, a mandrel collar 2 is mounted in a spindle housing 1 so that it is rotatable. The actual tool mandrel 3 is held within the mandrel collar 2. Two clamping elements 5 and 6 have an arcuate or semi-circular form and are held in a circumferential groove 4 in the housing. Notches 7 and 8 are illustrated in the upper ends of the respective clamps 5 and 6, while cylindrical retainer pins 11 and 12 are shown in bored holes 9 and 10 in the spindle housing 1. The lower ends of these pins extend into the notches of the clamping elements.

FIG. 1 shows the lower end of the clamps 5 and 6 formed with angular cut-away notches 13 and 14. In each of these angular cut-aways sits a diagonal shoulder 15 and 16 of the two tightening actuators or tensioning collars, which are actuated by the clamping screw 17, formed as a threaded spindle. The clamping screw 17 is fitted in the housing which has a bore drilled tangential to the spindle. The clamping screw also has a hand grip 19 extending radially at its outer end to facilitate rotation of the screw.

To actuate the clamping device, the hand grip 19 is turned, and the clamping screw 17 advances, thereby causing the two tensioning collars 15 and 16 to travel toward one another. Free turning of collar 15 is prevented by pin 20. The movement is transferred to the clamps 5 and 6 by engagement of the diagonal shoulders of the two tensioning collars 15 and 16 in notches 13 and 14 respectively. The clamps 5 and 6 can only travel a short distance in their longitudinal or circumferential direction within the circumferential groove 4. The notches 7 and 8 act as guide surfaces wherein the circumferential force on clamps 5 and 6 causes inward pressure against the outer surface of the mandrel collar. In this way, essentially central distribution of the zones of contact for the clamping force over the outer surface of the mandrel collar is achieved. One-sided loading of the spindle bearings, as well as radial deformation of the spindle collar is thereby avoided.

As can be seen from FIGS. 2a through 2c, each of the clamping elemens has a right angular cut-away notch 13 and extends over less than a half circle. At one end the diagonal surface notch 7 is found and at the other end the angular cut-away 13, which butts up against the tightening collar 15.

It is likely that in view of the above description, changes and improvements will occur to those skilled in the art which are within the scope of this invention. The invention is to be limited only by the appended claims.

What is claimed is:

1. A tightening apparatus for a mandrel collar of a milling or boring spindle, said apparatus comprising:
    a spindle housing having a central bore therein, a circumferential groove around said bore and at least two spaced holes intersecting said bore;
    a mandrel collar extending into said bore;
    a pair of arcuate clamping elements retained by said circumferential groove within said bore, each said clamping element having a notch adjacent one end thereof;
    retainer pin means in each of said spaced holes engaging said notches to prevent circumferential movement of said clamping elements; and
    means for engaging the other ends of said clamping elements and forcing said other ends toward each other thereby gripping the outer surface of said mandrel collar, said engaging means and said retainer pins being disposed about the circumference of said mandrel collar so as to apply force on said mandrel on angularly displaced zones which are substantially opposite one another, thereby minimizing radial distortion of said collar and insuring a centered position thereof within said bore.

2. The apparatus recited in claim 1 wherein:
    said other end of each said clamping element is formed with an angular cut-away;
    said engaging means comprises:
        a screw spindle tangentially mounted in said housing with respect to said bore;
        a pair of collars longitudinally spaced on said screw spindle and engaging the screw threads thereof so as to be drawn together or separated upon rotation of said screw spindle, each said collar being formed with a diagonal shoulder adapted to engage said cut-away; and
    means for hand rotating said screw spindle.

* * * * *